(12) United States Patent
Fiore et al.

(10) Patent No.: US 8,435,487 B2
(45) Date of Patent: May 7, 2013

(54) SYNTHESIS OF ZEOLITES FROM FLY ASH

(75) Inventors: Saverio Fiore, Tito Scalo (IT);
Francesco Cavalcante, Tito Scalo (IT);
Claudia Belviso, Tito Scalo (IT)

(73) Assignee: Consiglio Nazionale Delle Richerche, Rome (IT)

( * ) Notice: Subject to any disclaimer, the term of this patent is extended or adjusted under 35 U.S.C. 154(b) by 237 days.

(21) Appl. No.: 12/101,362

(22) Filed: Apr. 11, 2008

(65) Prior Publication Data
US 2009/0257948 A1 Oct. 15, 2009

(51) Int. Cl.
*C01B 33/36* (2006.01)
*C01B 39/00* (2006.01)
*C01F 7/00* (2006.01)

(52) U.S. Cl.
USPC ............................................................ 423/700

(58) Field of Classification Search ........... 423/700–718
See application file for complete search history.

(56) References Cited

U.S. PATENT DOCUMENTS

| 5,965,105 | A | * | 10/1999 | Rayalu et al. | 423/712 |
| 6,071,542 | A | * | 6/2000 | Tanimoto et al. | 424/618 |
| 2003/0049199 | A1 | * | 3/2003 | Ando et al. | 423/700 |
| 2008/0267860 | A1 | * | 10/2008 | Canos et al. | 423/701 |

OTHER PUBLICATIONS

Ojha, Keka et al., "Zeolite from fly ash: synthesis and characterization", Bull. Mater. Sci., vol. 27, No. 6 (Dec. 2004) pp. 555-564.*

* cited by examiner

*Primary Examiner* — Kaj K Olsen
*Assistant Examiner* — Ross J Christie
(74) *Attorney, Agent, or Firm* — Nixon & Vanderhye P.C.

(57) ABSTRACT

A process with fusion pre-treatment for synthesizing geopolymers and zeolites from fly ash, in particular X-type zeolites with pores of large dimensions and high capacity that utilize sea water and low incubation temperatures. Fly ash is initially mixed with NaOH to obtain a mixture, which is pulverized and then melted at the temperature of 550° C. After cooling, the melted mass is pulverized, dispersed in sea water with fixed ratios and left under stirring at ambient temperature for 12 hours. The incubation of the ground material in sea water takes place at a temperature of between 25 and 70 degrees centigrade. Once the incubation period is ended, the solid part is separated from the liquid phase (sea water) through centrifugation and subsequently rinsed and oven dried.

9 Claims, 6 Drawing Sheets

SYNTHESIS OF ZEOLITES FROM FLY ASH

The present invention relates to a process for synthesizing geopolymers and zeolites from fly ash. In particular, it relates to a process for synthesizing X-type zeolites. Zeolites are hydrated aluminosilicate minerals characterized by a three-dimensional open structure that makes them very useful in various practical uses and employed in particular to solve environmental problems linked to the immobilization of toxic elements. This use is closely linked to their cation exchange capacity (CEC), to the large surface area and to the typical structural characteristics (porosity) that in case allow any absorption and encapsulation of the pollutant.

Synthetic zeolites are characterized by a cation exchange capacity and by absorption capacities similar to, and in some cases greater than, natural zeolites.

Fly ash is a by-product of thermal power plants composed of mineral material refractory to combustion and of residual components for which combustion of the initial coal takes place incompletely. In particular, fly ash is characterized by three types of constituents: minerals (mainly quartz and mullite, subordinately hematite and magnetite), unburned coal particles and prevalent amorphous aluminosilicate phase. By virtue of its disordered atomic structure, of its porous nature and of its abundance, glass represents the main constituent involved in chemical reactions associated with the use of fly ash in geopolymer and zeolite synthesis.

Over the last decades, numerous methods have been proposed, generally hydrothermal activation, for geopolymer and zeolite synthesis starting from fly ash. The differences concern type of alkaline solutions, molarity of alkaline agents, solution/fly ash activation ratio, temperature, reaction time, pressure and incubation type.

Different types of zeolites can be synthesized, although the X-type zeolite, or faujasite, is particularly interesting as regards characteristics and possible uses, as it presents high cation exchange capacity due to its structure characterized by pores of large dimensions.

Two known processes are generally employed for synthesizing X type zeolites: a hydrothermal process and a hydrothermal process with fusion pre-treatment at high temperatures (500° C.).

Shih W-H. et al. (Conversion of fly ash into zeolites for ion-exchange applications. Materials Letters 28, 263-268.1996) describe the formation of X-type zeolite, using fly ash and distilled water, by means of a hydrothermal process comprising the following steps:
  a) mixing fly ash with a sodium hydroxide solution;
  b) stirring the mixture obtained;
  c) maintaining the mixture at room temperature;
  d) incubating the mixture at 38° C.;
  e) collecting the solid phase of the mixture;
  f) rinsing the solid part with distilled water, centrifuging and drying at 80° C.

In actual fact, these authors state that synthesis of X zeolite at 38° C. only occurred once and it was not possible to reproduce the result under the same conditions, given that the process depends greatly on the properties of the initial fly ash.

Moreover, the hydrothermal process has a low yield in zeolite X formation, as only a part of the fly ash particles are converted into zeolites. The use of distilled or tap water to prepare the solution is costly for industrial processes for synthesis of artificial zeolites.

Chang et al. (A general method for the conversion of fly ash into zeolites as ion exchangers for cesium. Ing. Eng. Chem. Res., 37, 71-78. 1998) describe the formation of X-type zeolite, using fly ash and distilled water, by means of a hydrothermal process, but with fusion pre-treatment at high temperatures, i.e. 550° C., that comprises the following steps:
  a) mixing fly ash and sodium hydroxide;
  b) grinding the mixture obtained;
  c) melting the ground mixture at high temperatures;
  d) grinding the melted and cooled mixture;
  e) mixing the ground material with water;
  f) stirring the solution obtained;
  g) incubating the solution at 60° C.

The hydrothermal process with fusion pre-treatment at high temperatures presents a greater conversion of fly ash into zeolite compared to the hydrothermal process alone, and in any case the formation of zeolite X under 60° C. is not documented. Data present in the literature in fact show experimental evidence of the formation of X-type zeolites with fusion pre-treatment only starting from incubation temperatures of over 60° C. In this process too the use of distilled or tap water increases process costs.

There is, therefore, the need for an X-type zeolite production process that solves the problems of the low yields in synthesis and of the high costs of processes for synthesizing zeolites X known in the art.

These problems are solved by the present invention with a synthesis process that utilizes sea water and low incubation temperatures.

The object of the present invention is a process according to claim 1.

It has in fact been discovered that there is a surprising increase in zeolite X production if, in a process with fusion pre-treatment of the type described above, sea water and low incubation temperatures are used to prepare the solution in step e). In particular, the incubation temperature is between 25 and 70° C., preferably between 30 and 60° C. and more preferably between 35 and 43° C.

These results indicate that sea water, used to cool the turbines of electric power plants, can be recycled for zeolite X synthesis without the need to employ other energy or with reduced energy input to further increase the incubation temperature in the zeolite production process.

The use of sea water for zeolite synthesis is described in two articles by Lee et al, although the process utilized is the hydrothermal one, i.e. without fusion pre-treatment, and it is used to form zeolites Na-P1 with incubation temperatures of over 100° C. The use of such high temperatures thus requires a high thermal input for the outflowing water, and in any case to synthesize zeolites with different characteristics to those of X-type, forming the object of the present invention.

The advantages of the process according to the invention are:
  reduction in the quantity of fly ash to be disposed in landfill;
  increase in the yield of zeolites X;
  elimination of costs for large-scale use of distilled or tap water;
  elimination or drastic reduction in costs to attain the incubation temperature, as with sea water the X-type zeolite is formed at low temperatures and therefore the outflowing sea water used to cool the turbine in thermal power plants can be employed directly in the process.

These and other advantages are illustrated below with reference to the drawings, also provided purely for a non-limiting illustrative purposes, where:

Figure 1:
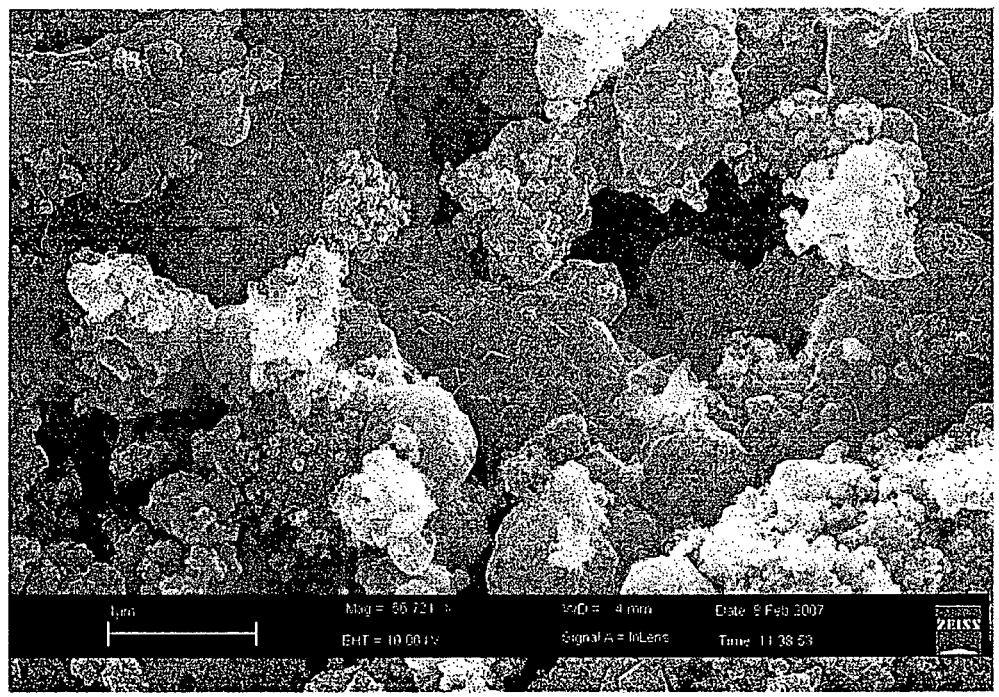
FIG. 1 shows a scanning electron microscope (SEM) image of Faujasite X, synthesized at 25° C. with the process according to the invention, in the case of sea water.

The method for zeolite synthesis according to the invention is a hydrothermal process with fusion pre-treatment.

In practice, the zeolite synthesis process is composed of the following steps:
1) mixing and grinding fly ash and caustic soda (solid NaOH);
2) melting of the mixture in an inert container at 550° C. for 1-2 h;
3) cooling and grinding the melted mass;
4) dispersing the pulverized material in water;
5) mechanical stirring for 12 hours;
6) incubating the solution at specific temperature.

According to the invention, sea water is utilized for the dispersion of step 4) and the incubation temperature is included in the range of 25-70° C., preferably in the range of 30-60° C. and more preferably in the range of 35-43° C.

Preferably, the grinding in steps 1) and 3) is such as to cause pulverization of the materials. For example, pulverization is obtained using a mechanical pulverizer with concentric disks for a time of 2 minutes at 700 rpm to reduce the dimensions of the particles and increase the specific surface.

According to a preferred aspect of the invention, before and after the mechanical stirring of step 5), the dispersion of step 4) is subjected to ultrasonic treatment for at least 10 minutes or in any case for a period sufficient to further reduce the dimensions of the particles.

The process according to the invention provides for the formation of a solid mixture of fly ash and NaOH in well-defined ratios, which is subsequently crushed. Said crushing can be performed with various means, for example, it can be performed with a crusher, a mill or a mechanical pulverizer according to the degree of pulverization desired. The pulverized material is then melted in a crucible at a temperature of at least 550° C. for a period of approximately 2 hours, after which the melted mass is cooled. The solid mass obtained is crushed, for example with one of the previously described methods, and the powder obtained is mixed with sea water to form a solution that is kept under stirring for a time of between 8 and 16 hours, preferably between 10 and 14 and even more preferably for 12 hours. After stirring, the solution is incubated for 4 days at a temperature of between 35 and 70° C. The process terminates with drying for 12 h at 80° C. of the solid part separated by centrifugation, after rinsing with distilled water.

It was discovered that by utilizing sea water with the process according to the invention zeolite X is formed in the ranges specified above and already at 35° C. the yield, expressed as percentage by weight, is of approximately 17%. Increasing the incubation temperature to 40° C. the yield of zeolite X increases to approximately 23% and continues to increase also at 45° C. and 60° C., being respectively approximately 27% and 30%.

The same process with distilled or tap water gave much lower yields in the range of 35-40° C. and in any case lower values between 45 and 60° C. In fact, while at 35° C. the yield is approximately 2-3% and at 40 it is approximately 5-7%, in the range of 45-60° C. the yield is respectively of approximately 24% and approximately 27%. Moreover, besides obtaining a surprising effect of zeolite X formation below 60° C. with a hydrothermal process with fusion pre-treatment according to the invention, the use of sea water allows, in the incubation temperature range of 35-40° C., zeolite X formation with yields up to 8 times greater compared to the same process with distilled or tap water.

The data indicated above were determined with the Rietveld method using corundum as internal standard and are summarized in Table 1.

TABLE 1

Quantity of zeolite X synthesized at temperatures of 25, 35, 40, 45 and 60° C. with the process according to the invention (% by weight).

| Temperature | Sea Water | Distilled Water |
|---|---|---|
| 25° C. | 8-9 | — |
| 35° C. | 17 | 2-3 |
| 40° C. | 23 | 5-7 |
| 45° C. | 27 | 24 |
| 60° C. | 30 | 27 |

Examples of application of said process for forming synthetic zeolites starting from fly ash, employing sea water and low incubation temperatures, are indicated below purely for non-limiting illustrative purposes.

Figure 2:
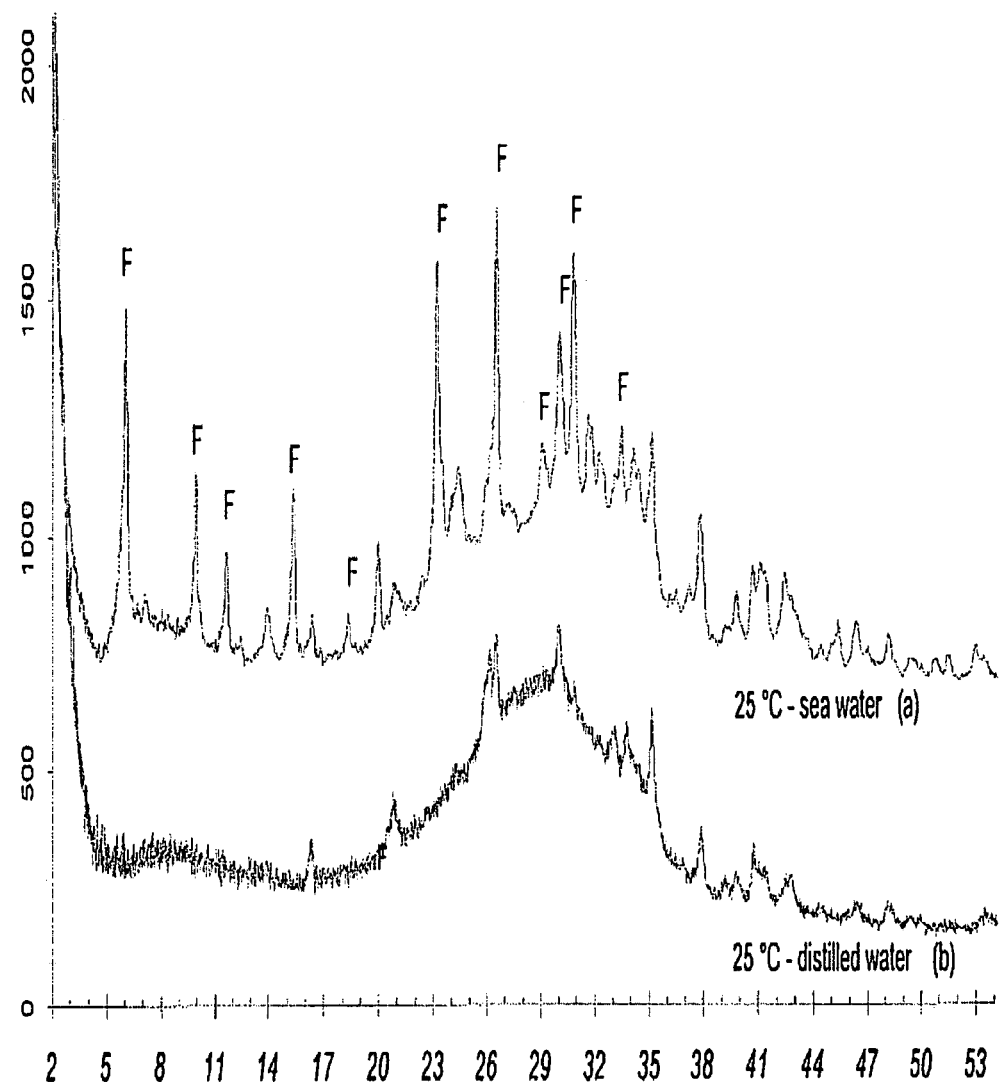
FIG. 2 shows a diffractogram of Faujasite X, synthesized with the process according to the invention, at an incubation temperature of 25° C. in the case of sea water and of distilled water.

FIG. 1 is a scanning electron microscope (SEM) image of an zeolite X synthesized at 25° C. with the process according to the invention and FIG. 2 shows the corresponding diffractogram.

EXAMPLE 1

According to the present example, fly ash is initially mixed with caustic soda (NaOH) in a ratio of 1:1.2, the mixture obtained is then pulverized with the aid of a mechanical pulverizer with concentric disks for a time of 2 minutes at 700 rpm.

After pulverization, the material is placed in a ceramic crucible and melted at the temperature of 550° C. for 1-2 hours.

After cooling of the melted mass, it is initially crushed manually followed by pulverization with a mechanical mill for a few minutes in order to once again reduce the material to fine powder.

Subsequently, 8.8 g of pulverized material is dispersed in 43 ml of sea water and left under stirring at ambient temperature for 12 hours. Upon completion of this step the solution (sea water+fly ash+caustic soda) is incubated for 4 days at a temperature of 35° C.

After the incubation period the solid part is separated from the liquid phase (sea water) through centrifugation. A swing arm centrifuge is used in our laboratories, and therefore the centrifugation operation is performed for 15 minutes setting a speed of 4500 rpm with a temperature of approximately 26° C. The operation can also be performed with a fixed rotor centrifuge, obviously changing centrifugation times and speed, so as to make these more suitable for the new rotor utilized.

The subsequent step is characterized by two rinses with distilled water with subsequent centrifugation.

To conclude, the separated and rinsed solid phase is left to dry in the oven for 12 hours at 80° C.

EXAMPLE 1A

The process of Example 1 is repeated identically except for the use of distilled water.

Figure 3:
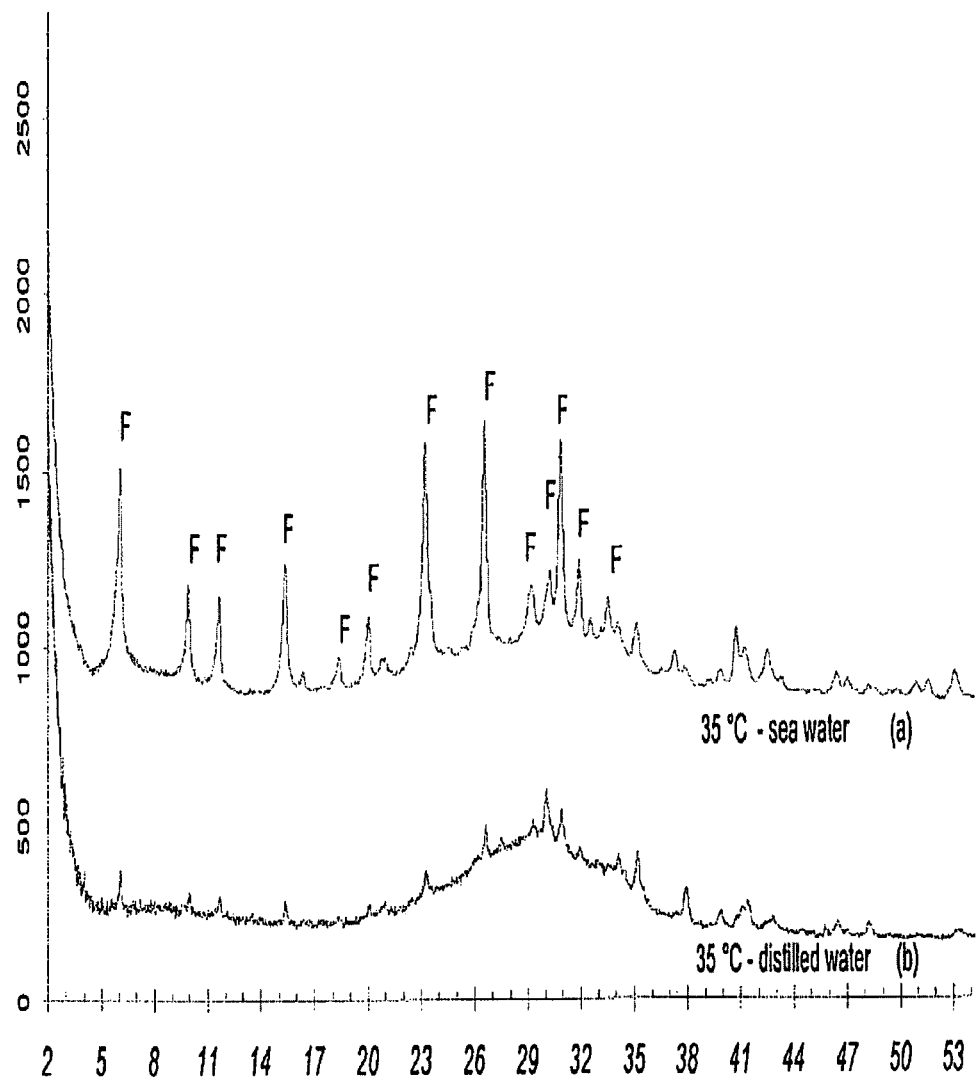
FIG. 3 shows a diffractogram of Faujasite X, synthesized with the process according to the invention, at an incubation temperature of 35° C. in the case of sea water and of distilled water.

FIG. 3 shows the diffractogram of the Faujasite X that forms at 35° C. with sea water (a) and with distilled water (b). The Faujasite X peaks are indicated with the letter F.

EXAMPLE 2

According to the present example, fly ash is initially mixed with caustic soda (NaOH) in a ratio of 1:1.2, the mixture obtained is then pulverized with the aid of a mechanical pulverizer with concentric disks for a time of 2 minutes at 700 rpm.

After pulverization, the material is placed in a ceramic crucible and melted at the temperature of 550° C. for 1-2 hours.

After cooling of the melted mass, it is initially crushed manually followed by pulverization with a mechanical mill for a few minutes in order to once again reduce the material to fine powder.

Subsequently, 8.8 g of pulverized material is dispersed in 43 ml of sea water and left under stirring at ambient temperature for 12 hours. Upon completion of this step the solution (sea water+fly ash+caustic soda) is incubated for 4 days at a temperature of 40° C.

After the incubation period the solid part is separated from the liquid phase (sea water) through centrifugation. A swing arm centrifuge is used in our laboratories, and therefore the centrifugation operation is performed for 15 minutes setting a speed of 4500 rpm with a temperature of approximately 26° C. The operation can also be performed with a fixed rotor centrifuge, obviously changing centrifugation times and speed, so as to make these more suitable for the new rotor utilized.

The subsequent step is characterized by two rinses with distilled water with subsequent centrifugation.

To conclude, the separated and rinsed solid phase is left to dry in the oven for 12 hours at 80° C.

EXAMPLE 2A

Figure 4:
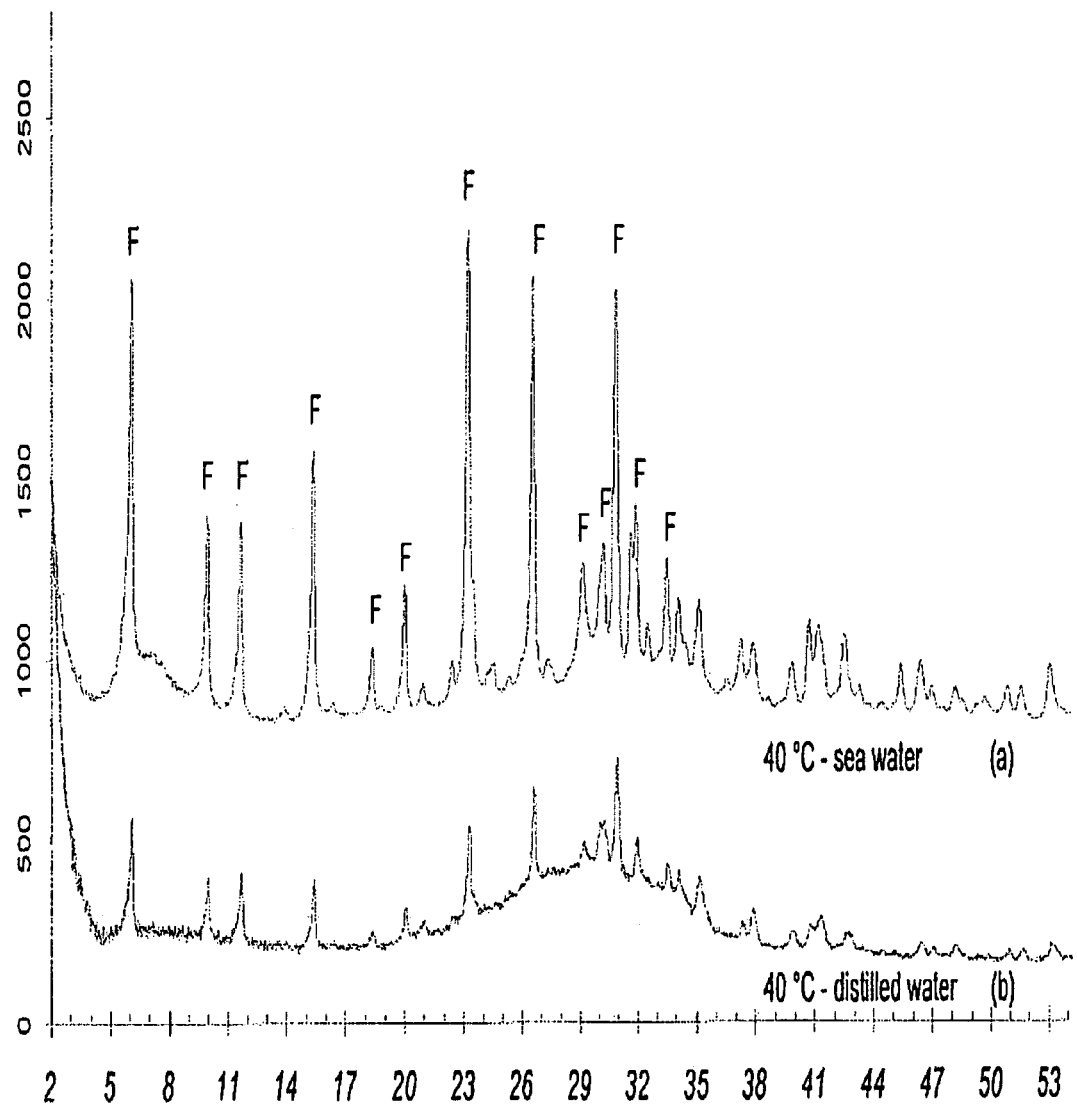
FIG. 4 shows a diffractogram of Faujasite X, synthesized with the process according to the invention, at an incubation temperature of 40° C. in the case of sea water and of distilled water.

The process of Example 2 is repeated identically except for the use of distilled water. FIG. 4 shows the diffractogram of the Faujasite X that forms at 40° C. with sea water (a) and with distilled water (b). The Faujasite X peaks are indicated with the letter F.

EXAMPLE 3

According to the present example, fly ash is initially mixed with caustic soda (NaOH) in a ratio of 1:1.2, the mixture obtained is then pulverized with the aid of a mechanical pulverizer with concentric disks for a time of 2 minutes at 700 rpm.

After pulverization, the material is placed in a ceramic crucible and melted at the temperature of 550° C. for 1-2 hours.

After cooling of the melted mass, it is initially crushed manually followed by pulverization with a mechanical mill for a few minutes in order to once again reduce the material to fine powder.

Subsequently, 8.8 g of pulverized material is dispersed in 43 ml of sea water and left under stirring at ambient temperature for 12 hours. Upon completion of this step the solution (sea water+fly ash+caustic soda) is incubated for 4 days at a temperature of 45° C.

After the incubation period the solid part is separated from the liquid phase (sea water) through centrifugation. A swing arm centrifuge is used in our laboratories, and therefore the centrifugation operation is performed for 15 minutes setting a speed of 4500 rpm with a temperature of approximately 26° C. The operation can also be performed with a fixed rotor centrifuge, obviously changing centrifugation times and speed, so as to make these more suitable for the new rotor utilized.

The subsequent step is characterized by two rinses with distilled water with subsequent centrifugation.

To conclude, the separated and rinsed solid phase is left to dry in the oven for 12 hours at 80° C.

EXAMPLE 3A

The process of Example 3 is repeated identically except for the use of distilled water.

Figure 5:
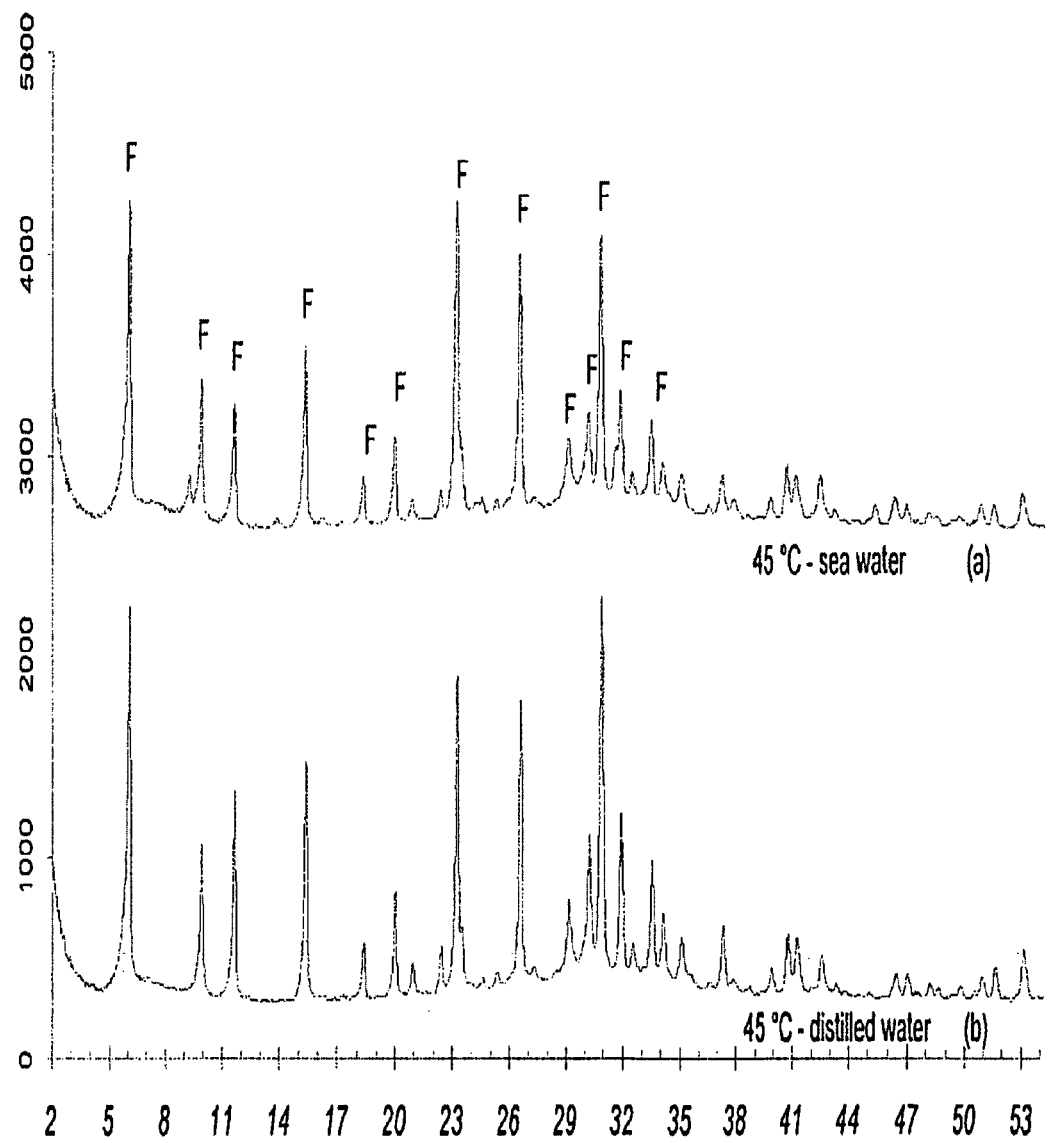
FIG. 5 shows a diffractogram of Faujasite X, synthesized with the process according to the invention, at an incubation temperature of 45° C. in the case of sea water and of distilled water.

FIG. 5 shows the diffractogram of the Faujasite X that forms at 45° C. with sea water (a) and with distilled water (b). The Faujasite X peaks are indicated with the letter F.

EXAMPLE 4

According to the present example, fly ash is initially mixed with caustic soda (NaOH) in a ratio of 1:1.2, the mixture obtained is then pulverized with the aid of a mechanical pulverizer with concentric disks for a time of 2 minutes at 700 rpm.

After pulverization, the material is placed in a ceramic crucible and melted at the temperature of 550° C. for 1-2 hours.

After cooling of the melted mass, it is initially crumbled manually followed by pulverization with a mechanical mill for a few minutes in order to once again reduce the material to fine powder.

Subsequently, 8.8 g of pulverized material is dispersed in 43 ml of sea water and left under stirring at ambient temperature for 12 hours. Upon completion of this step the solution (sea water+fly ash+caustic soda) is incubated for 4 days at a temperature of 60° C.

After the incubation period the solid part is separated from the liquid phase (sea water) through centrifugation. A swing arm centrifuge is used in our laboratories, and therefore the centrifugation operation is performed for 15 minutes setting a speed of 4500 rpm with a temperature of approximately 26° C. The operation can also be performed with a fixed rotor centrifuge, obviously changing centrifugation times and speed, so as to make these more suitable for the new rotor utilized.

The subsequent step is characterized by two rinses with distilled water with subsequent centrifugation.

To conclude, the separated and rinsed solid phase is left to dry in the oven for 12 hours at 80° C.

EXAMPLE 4A

The process of Example 4 is repeated identically except for the use of distilled water.

Figure 6:
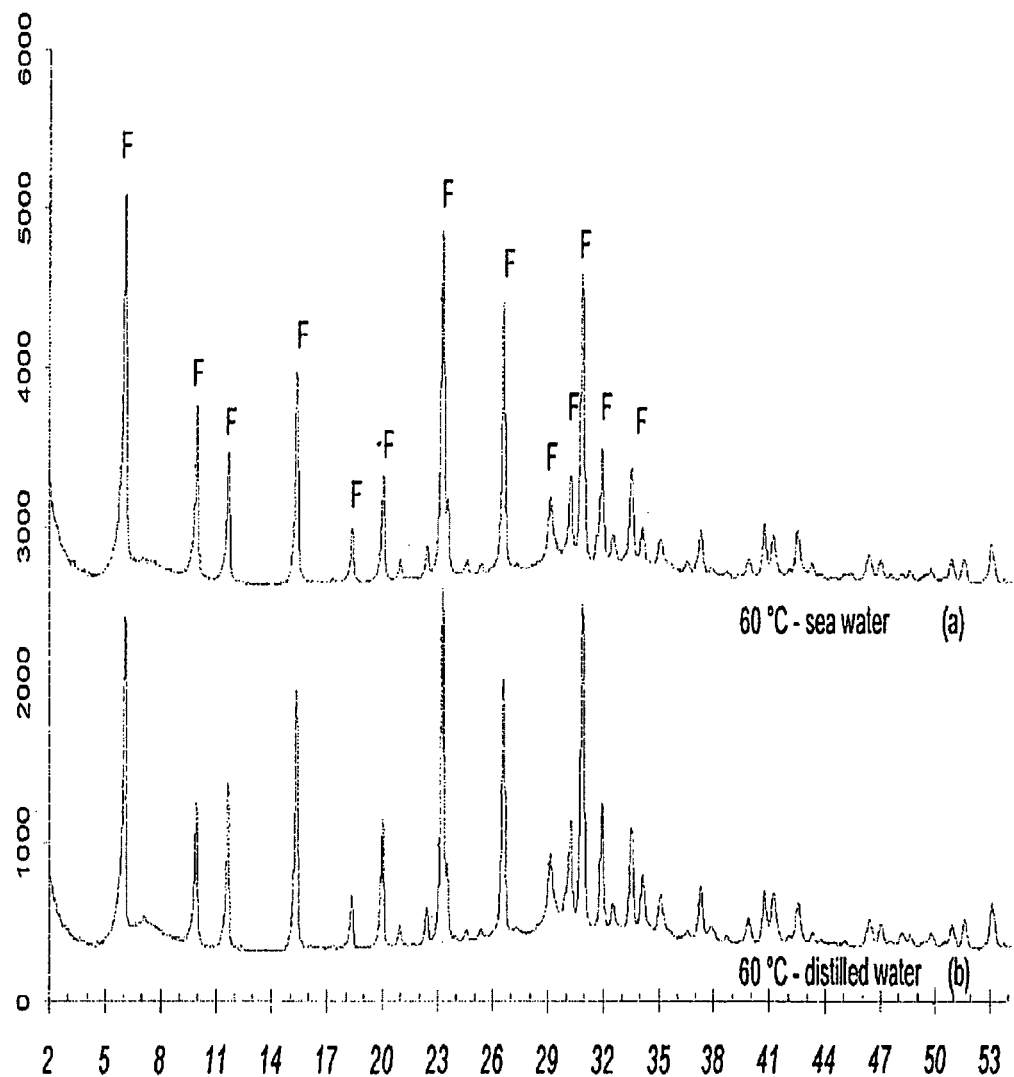
FIG. 6 shows a diffractogram of Faujasite X, synthesized with the process according to the invention, at an incubation temperature of 60° C. in the case of sea water and of distilled water.

FIG. 6 shows the diffractogram of the Faujasite X that forms at 60° C. with sea water (a) and with distilled water (b). The Faujasite X peaks are indicated with the letter F.

The invention claimed is:

1. A hydrothermal process with fusion pre-treatment for synthesizing X-type zeolites from fly ash comprising the steps of:
    a) mixing fly ash and sodium hydroxide;
    b) crushing the mixture obtained;
    c) melting the mixture obtained;
    d) crushing the melted and cooled mixture;
    e) mixing the crushed material with sea water;
    f) stirring a solution obtained; and
    g) incubating the solution obtained within a temperature range between 25 and 70 degrees centigrade to synthesize the zeolites X from the fly ash.

2. The process according to claim 1, characterized in that said incubating takes place at a temperature of between 30 and 60 degrees centigrade.

3. The process according to claim 1, characterized in that said incubating takes place at a temperature of between 35 and 43 degrees centigrade.

4. The process according to claim 1, characterized in that each of the crushing steps is a pulverization.

5. The process according to claim 1, characterized in that the ground material mixed with sea water is stirred mechanically at room temperature for a period of between 8 and 16 hours.

6. The process according to claim 5, characterized in that the ground material mixed with sea water is stirred mechanically at room temperature for a period of between 10 and 14 hours.

7. The process according to claim 5, characterized in that the ground material mixed with sea water is stirred mechanically at room temperature for 12 hours.

8. The process according to claim 1 characterized in that the dispersion of step e) is subjected to ultrasonic treatment before and after the stirring of step f) to reduce the dimensions of the particles.

9. The process according to claim 1, characterized in that the incubating takes place for an incubation period, further comprising separating from the sea water a solid part after the incubation period through centrifugation.

* * * * *